(12) United States Patent
Lee et al.

(10) Patent No.: US 8,325,754 B2
(45) Date of Patent: Dec. 4, 2012

(54) METHOD FOR TRANSMITTING NETWORK DATA

(75) Inventors: Kyung-Soo Lee, Dongjak-gu (KR);
Sang-Ki Yun, Yeongdeungpo-gu (KR);
Yong-Tae Park, Uijeongbu-si (KR);
Hyo-Gon Kim, Songpa-gu (KR);
Young-Han Kim, Seocho-gu (KR)

(73) Assignee: Soongsil University research Consortium techno-Park, Seoul (KR)

( * ) Notice: Subject to any disclaimer, the term of this patent is extended or adjusted under 35 U.S.C. 154(b) by 798 days.

(21) Appl. No.: 12/252,790

(22) Filed: Oct. 16, 2008

(65) Prior Publication Data
US 2010/0098033 A1    Apr. 22, 2010

(51) Int. Cl.
*H04J 3/26* (2006.01)
(52) U.S. Cl. .................. 370/432; 370/390; 714/749
(58) Field of Classification Search .................. None
See application file for complete search history.

(56) References Cited

U.S. PATENT DOCUMENTS

| 2004/0151133 | A1* | 8/2004 | Yi et al. ..................... 370/312 |
| 2007/0160046 | A1* | 7/2007 | Matta ......................... 370/390 |
| 2007/0201468 | A1* | 8/2007 | Jokela ........................ 370/390 |
| 2008/0031248 | A1* | 2/2008 | Vilei et al. ................. 370/390 |
| 2008/0247407 | A1* | 10/2008 | Westphal et al. .......... 370/406 |
| 2009/0323605 | A1* | 12/2009 | Umesh et al. ............. 370/329 |
| 2010/0177676 | A1* | 7/2010 | Wang et al. ............... 370/312 |
| 2011/0002274 | A1* | 1/2011 | Grandblaise et al. ...... 370/329 |
| 2011/0096710 | A1* | 4/2011 | Liu et al. ................... 370/312 |
| 2011/0116435 | A1* | 5/2011 | Liu et al. ................... 370/312 |

* cited by examiner

*Primary Examiner* — Bob Phunkulh
(74) *Attorney, Agent, or Firm* — Sherr & Jiang, PLLC

(57) ABSTRACT

A method for transmitting network data is provided. A sender and receivers can stably transmit and receive data using a packet reception result report request frame and a packet reception result report frame, and data stability at the receivers can be improved through retransmission of network-coded data. In addition, service can be provided at a high transfer rate and with good data stability by adjusting a transfer rate according to a network environment using adaptive transfer rate control.

14 Claims, 3 Drawing Sheets

METHOD FOR TRANSMITTING NETWORK DATA

BACKGROUND OF THE INVENTION

1. Field of the Invention

The present disclosure relates to a method for transmitting network data and, more particularly, to a method for transmitting network data that is capable of adjusting a data transfer rate according to a transfer environment while guaranteeing data transfer stability.

2. Discussion of the Related Art

The development of electronics and communication technology has enabled users to transmit and receive data anytime, anywhere over a network. Networks include wired networks with a cable directly connecting electronic devices and wireless networks without a cable.

Wireless networks may be any type of wireless computer network and enable network nodes to communicate without using a cable.

Wireless networks may be classified as a Wireless Personal Area Network (WPAN), a Wireless Local Area Network (WLAN), a Wireless Metropolitan Area Network (WMAN), or a Wireless Wide Area Network (WWAN), depending on the range of the network.

Wireless networks allow for high mobility and free communication without environmental constraints because they do not use a cable. However, a data transfer rate may vary with an environment due to a cable not being used, and data transfer stability is lower than in wired communication.

SUMMARY OF THE INVENTION

The present disclosure is directed to a method for transmitting network data that is capable of adjusting a data transfer rate according to a transfer environment while guaranteeing data transfer stability in a wireless network environment.

A first aspect of the present disclosure provides a method for transmitting network data in a wireless network, the method comprising: broadcasting data by a sender; requesting, by the sender, a data reception result report from each receiver; and receiving the reception result report from each receiver receiving the reception result report request.

A second aspect of the present disclosure provides a method for transmitting network data in a wireless network, the method comprising: broadcasting transmission data by a sender; network-coding the transmission data by the sender; and broadcasting the network-coded retransmission data by the sender.

A third aspect of the present disclosure provides a method for transmitting network data in a wireless network, the method comprising: broadcasting data by a sender; requesting, by the sender, a data reception result report from each receiver; receiving the reception result report from each receiver that received the reception result report request; determining whether a data loss rate at the receiver is moderate based on the reception result report; and controlling a data transfer rate depending on the determination result.

It is to be understood that both the foregoing general description and the following detailed description of the present invention concern only exemplary embodiments intended to provide further explanation of the claimed invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
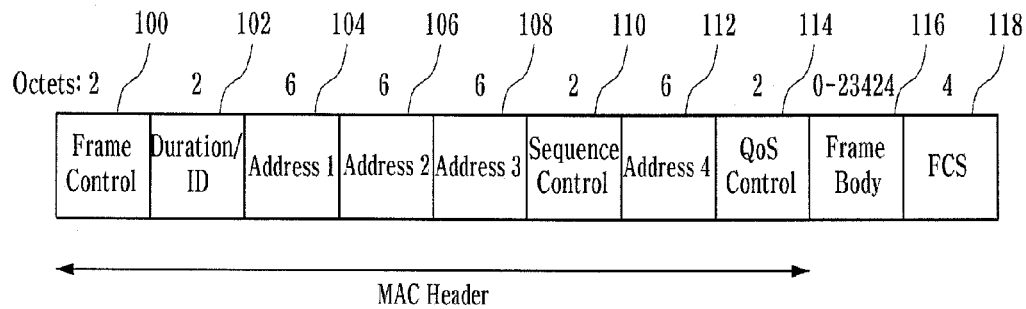
FIG. 1 schematically illustrates a format of an IEEE 802.11 Media Access Control (MAC) frame.

Hereinafter, a method for transmitting network data according to the present disclosure will be described in detail with reference to the accompanying drawings.

Wireless networks may be classified as a Wireless Personal Area Network (WPAN), a Wireless Local Area Network (WLAN), a Wireless Metropolitan Area Network (WMAN), or a Wireless Wide Area Network (WWAN), depending on the range of the network. The WPAN is for a personal area, the WLAN is for a local area, the WMAN is for a metropolitan area, and the WWAN is for a wide area.

IEEE 802.11 is a collection of WLAN standards proposed by the IEEE LAN/MAN standard group (IEEE 802). 802.11 standards include 802.11, 802.11a, 802.11b, 802.11g, 802.11n, and the like, which have continuously evolved. The 802.11 standard defines a physical layer and a data link layer of the WLAN.

Data transmission and reception schemes in a wireless network include unicast, multicast, and broadcast schemes. The unicast scheme is for a sender and a receiver transmitting and receiving data in a one-to-one correspondence, the multicast scheme is for a sender transmitting data to a defined number of receivers, and the broadcast scheme is for a sender transmitting data to many unspecified receivers.

Among the data transmission and reception schemes, the broadcast scheme has low stability and data transfer rate due to properties of a wireless network. Accordingly, it is difficult to support a broadcasting service needing a high transfer rate in the wireless network. The present disclosure is directed to a scheme of increasing a data transfer rate while guaranteeing high stability, using packet reception result reporting between a sender and a receiver, packet retransmission using network coding, and adaptive control of a transfer rate. For convenience of illustration, it is assumed hereinafter that the wireless network is a WLAN. In the WLAN, a station (STA) may be a sender, and an access point (AP) may be a sender.

When a 1:1 report scheme is used for a sender to receive broadcasting reception result reports from a plurality of receivers, packet reception results from the receivers may collide and disappear. Accordingly, the respective receivers are forced to report packet reception results to the sender during a certain period to prevent the packet reception results from being transmitted to the sender every packet. In addition, the respective receivers report the packet reception results to the sender at certain intervals so that the packet reception results can be prevented from colliding at the sender, which can successively receive the packet reception result reports from all the receivers. The sender transmits data for a packet reception result report request to each receiver, and, in response to the request, the receiver reports the packet reception result to the sender. The sender requests the packet reception result report from the receivers at certain intervals to prevent collision of the packet reception result reports.

FIG. 1 schematically illustrates a format of an IEEE 802.11 Media Access Control (MAC) frame. The MAC frame format includes a MAC header and a frame body. The MAC header includes a frame control field 100, a duration/ID field 102, address fields 104, 106, 108 and 112, a sequence control field 110, and a QoS control field 114. The frame body includes a frame body field 116 and a Frame Check Sequence (FCS) field 118. A value on each field (octet) denotes a number of bytes of the field.

In FIG. 1, the frame control field 100 includes control information used for defining a type of an 802.11 MAC frame and providing information necessary for following fields to understand how to process the MAC frame. The duration/ID field 102 is used for all control type frames, except a subtype of Power Save (PS) poll, to indicate a remaining duration needed to receive following frames. When the sub-type is PS poll, the field contains an association identity (AID) of a transmitting STA. The address fields 104, 106, 108, and 112 respectively include destination address, source address, receiver address, and transmitter address information depending on the flame type. Values of the address fields 104, 106, 108, and 112 are defined in the IEEE 802.11 standard.

The sequence control field 110 includes two subfields: a fragment number field and a sequence number field, which include information on a fragment number and a sequence number of each frame, respectively. The Quality of Service (QoS) control field 114 includes information on QoS related to frame transmission and reception, the frame body field 116 includes frame data, and the FCS field 118 includes Cyclic Redundancy Check (CRC) information associated with frame error correction. The transmitting station (STA) uses a cyclic redundancy check (CRC) over all fields of the MAC header and the frame body field to generate an FCS value. The receiving STA then uses the same CRC calculation to determine its own value of the FCS field to verify whether any errors occurred in the frame during transmission.

Figure 2:
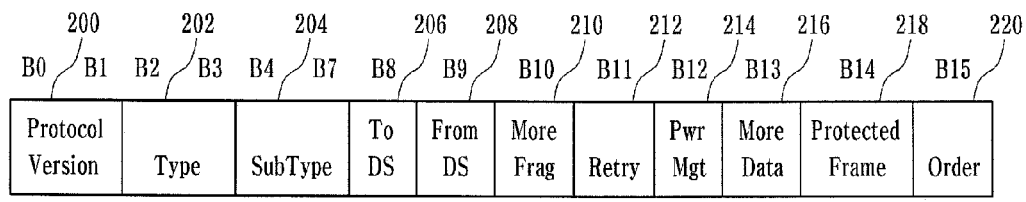
FIG. 2 schematically illustrates a format of a frame control field.

FIG. 2 schematically illustrates a format of the frame control field. The frame control field consists of 2 bytes (i.e., 16 bits) and includes a protocol version field 200, a type field 202, a subtype field 204, a To DS (Distributed System) field 206, a From DS field 208, a more fragments (More Frag) field 210, a retry field 212, a power management (Pwr Mgt) field 214, a more data field 216, a protected frame field 218, and an order field 220. A value in bits below each field denotes a number of bits of the field.

The protocol version field 200 includes version information of 802.11. The protocol version provides a current version of the 802.11 protocol used. The type field 202 and the subtype field 204 include information for determining the type of a MAC frame, such as a control, data, or management. The type is determined by information included in the type field 202. The subtype field 204 includes information for determining a subtype of each type.

The To DS field 206 and the From DS field 208 include information on whether a frame is transmitted or received to or from a Distributed System (DS). The More Frag field 210 includes information on whether there are more fragments following the frame. The more fragment indicates whether more fragments of the frame, either data or a management type, are to follow. The retry field 212 indicates whether the frame, for either data or a management frame type, is being retransmitted. The Pwr Mgt field 214 includes information on whether the transmitting STA is in an active mode or a power-save mode. The more data field 216 indicates to the STA in power-save mode that the AP has more frames to send. It is also used for APs to indicate that additional broadcast/multicast frames are to follow. The protected frame field 218 includes information on whether a frame is encrypted or authenticated, and the order field 220 indicates that all received data frames must be processed in order.

When the sender transmits the packet reception result report request frame to each receiver to request the packet reception result report, or receives the packet reception result report frame from the receiver as described above, the management frame type may be used. That is, the packet reception result report request frame and the packet reception result report frame may be transmitted and received using the MAC frame of a management frame type. Accordingly, the packet reception result report request frame and the packet reception result report frame include information indicating a management frame in the type field 202 of the frame control field 100 of the MAC frame. The MAC frame indicates a management frame, a control frame, and a data frame when the value of type field 202 are "00," "01" and "10", respectively.

A message requesting the receiver to report the packet reception result and a message reporting the packet reception result to the sender are included in the frame body field 116 of the MAC frame.

Figure 3:
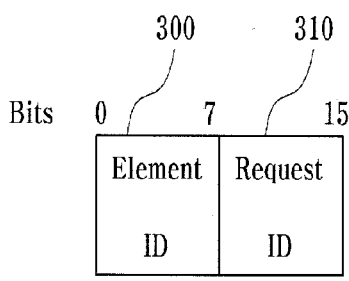
FIG. 3 schematically illustrates information in a frame body field included in a packet reception result report request frame according to an exemplary embodiment of the present disclosure.

FIG. 3 schematically illustrates information in the frame body field included in the packet reception result report request frame according to an exemplary embodiment of the present disclosure. In the packet reception result report request frame, a frame body field 116 includes an element ID field 300 and a request ID field 210, as shown in FIG. 3. Each of the element ID field 300 and the request ID field 310 consists of 8 bits. The element ID field 300 includes information indicating that a current frame requests the packet reception result report, and the request ID field 310 includes information for identifying a current packet reception result report request frame from other packet reception result report request frames. A value of the request ID field 310 differs among packet reception result report request frames.

Upon receipt of a MAC frame including the information shown in FIG. 3 in the frame body field, the receiver transmits the packet reception result report frame to the sender.

Figure 4:
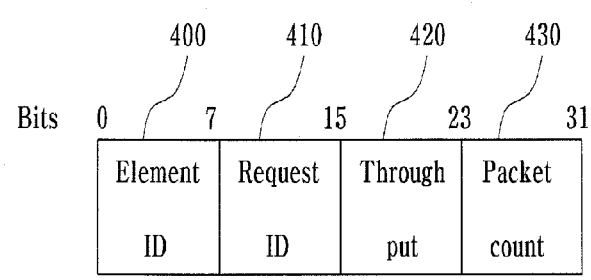
FIG. 4 schematically illustrates information in a frame body field included in a packet reception result report frame according to an exemplary embodiment of the present disclosure.

FIG. 4 schematically illustrates information in the frame body field included in the packet reception result report frame according to an exemplary embodiment of the present disclosure. The frame body field 116 of the packet reception result report frame includes an element ID field 400, a request ID field 410, a throughput field 420, and a packet count field, as shown in FIG. 4. Each of the element ID field 400, the request ID field 410, the throughput field 420, and the packet count field consists of 8 bits.

The element ID field 400 includes information indicating that a current frame is the packet reception result report frame, and the request ID field 410 includes a value that is the same as that of the request ID field 310 of the packet reception result report request frame received by the receiver. The request ID field 410 indicates that the packet reception result report frame corresponds to a specific packet reception result report request frame, that is, that the packet reception result report frame is a result report frame in a specific period. The throughput field 420 includes information on a number of packets processed by the receiver for a predetermined period of time, and the packet count field 430 includes information on a number of packets received by the receiver for a predetermined period of time.

Use of the packet reception result report request frame and the packet reception result report frame described above allows transmission of the result report request and the report without collision between the sender and the receivers that transmit and receive packet data by a broadcast scheme. This can result in high data transfer stability in the wireless network.

In the case of the broadcast scheme, a sender transmits data to many unspecified receivers. Accordingly, it is difficult for a sender to recognize and retransmit data lost at each receiver. And data transfer stability is low. In the present disclosure, data retransmission is made using network coding for high transmission stability. The sender transmits a network-coded data to the receivers as a data retransmission. The sender may transmit and retransmit data using the MAC frame of a data type.

Figure 5:
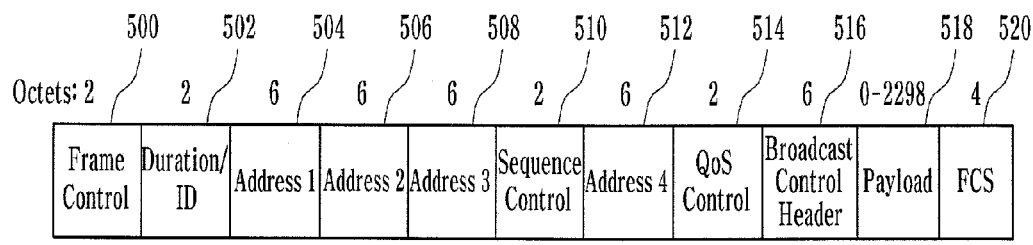
FIG. 5 schematically illustrates a format of a MAC frame of a data frame including transmission data according to an exemplary embodiment of the present disclosure.

FIG. 5 schematically illustrates a format of a MAC frame of a data frame including transmission data according to an exemplary embodiment of the present disclosure. A sender includes transmission data into the frame shown in FIG. 5 and broadcasts it to the receivers. The frame of FIG. 5 includes a broadcast control header field 516, which includes information on a relationship with data to be subsequently retransmitted.

In the MAC frame shown in FIG. 5, respective fields are the same as those of the MAC frame shown in FIG. 1, so a description thereof will be omitted. The broadcast control header field 516 may comprise information for identifying a transmission data frame for transmitting a transmission data packet to receivers, from a retransmission data frame for transmitting a retransmission data packet to the receivers, retransmission order information, and network coding matrix information, and so on.

Figure 6:
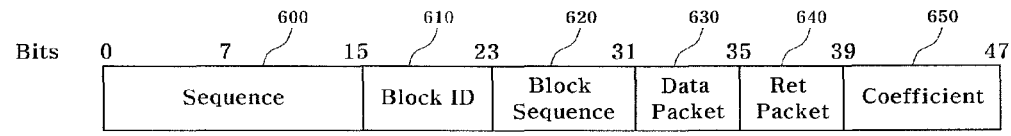
FIG. 6 schematically illustrates information in a broadcast control header field according to an exemplary embodiment of the present disclosure.

FIG. 6 schematically illustrates information in the broadcast control header field according to an exemplary embodiment of the present disclosure. The broadcast control header field includes a sequence field 600, a block ID field 610, a block sequence field 620, a data packet field 630, a retransmission packet (Ret packet) field 640, and a coefficient field 650.

The sequence field 600 includes sequence order information of all data packets to be transmitted to receivers. The block ID field 610 includes information for identifying a block of a data packet included in the payload field 518. The block ID field 610 is provided so that a transmission data packet to be transmitted and a retransmission data packet to be subsequently transmitted have the same block ID value. Accordingly, they can be identified from transmission data and retransmission data of other blocks. The block sequence field 620 includes information on an order within the block identified by the ID field 610. One block may be divided by several data sequences. If four transmission data and four corresponding retransmission data are included in a first block, the transmission data may have first, second, third, and fourth block sequences, and the retransmission data may have fifth, sixth, seventh, and eighth block sequences. Each block sequence may be initialized at every block. The receiver may identify the transmission data frame from the retransmission data frame using the order information in the block sequence field.

The data packet field 630 includes information on a number of times data of a block identified by the block ID field 610 is transmitted, and the Ret packet field 640 includes information on a number of times the data of the identified block is retransmitted. The coefficient field 650 includes coding matrix information needed for the receiver to decode a network-coded retransmitted data packet.

The sender broadcasts data to the receivers using the data frame shown in FIG. 5 and then retransmits the network-coded retransmission data. In the retransmission, the sender broadcasts the retransmission data only if an amount of data traffic the sender can transmit is greater than that to be transmitted. For example, even when an amount of data traffic the sender can broadcast through wireless communication is greater than that from an upper layer of a service provided by the sender, the sender can broadcast the retransmission data.

In retransmission, the sender codes retransmission data using a network coding matrix, loads the coded data into the frame body of the MAC frame, and broadcasts the frame data. The sender may code the retransmission data using linear network coding. The receiver decodes data using the network-coded retransmitted data, previously received data, and a network coding inverse-matrix. The receiver can obtain the sender-transmitted data using the network coding even when the received data is partially lost. Accordingly, it is possible to obtain the same effects as if the retransmission is made to all the receivers regardless of packet reception states of the receivers, and to obtain high data transfer stability. It is assumed herein that the sender transmits four transmission data and retransmits four retransmission data. If a third of the four transmission data is lost at the first receiver, the first receiver can obtain the third data by network-decoding the three other transmission data and the four retransmission data.

Figure 7:
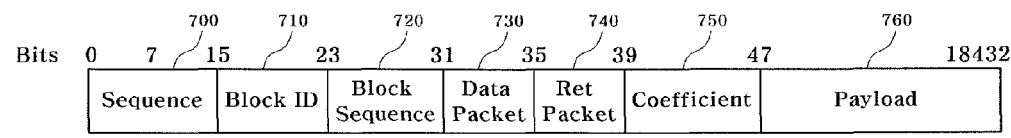
FIG. 7 schematically illustrates information for a data retransmission frame according to an exemplary embodiment of the present disclosure.

FIG. 7 schematically illustrates information for a data retransmission frame according to an exemplary embodiment of the present disclosure. A sender can broadcast the retransmission data to respective receivers, with the information shown in FIG. 7 included in the frame body 116 of the MAC frame shown in FIG. 1.

The respective fields, such as a sequence field 700, a block ID field 710, a block sequence field 720, a data packet field 730, a Ret packet field 740, and a coefficient field 750 in FIG. 7 are the same as in FIG. 6. The network-coded retransmission data is included in a payload field 760.

Figure 8:
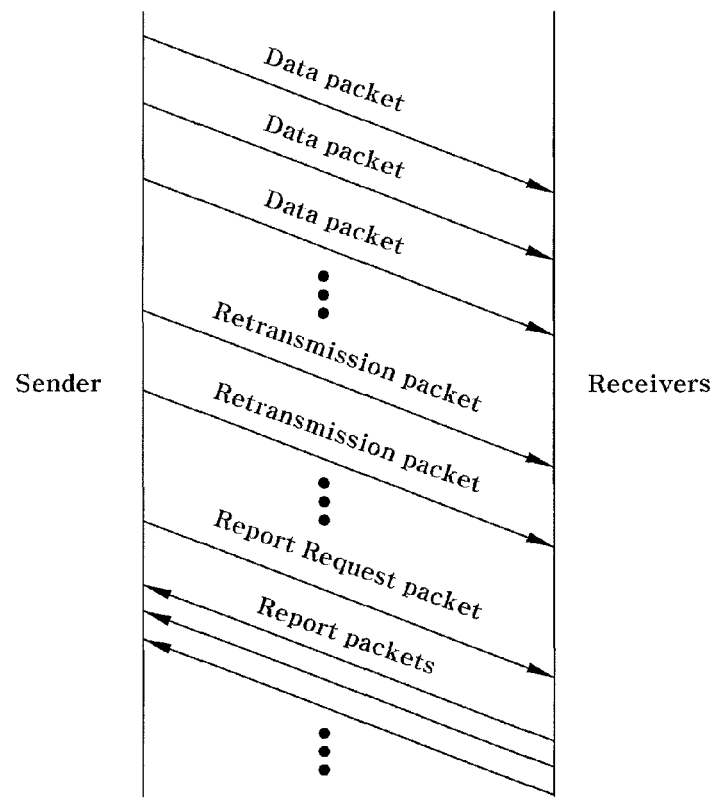
FIG. 8 schematically illustrates a process of transmitting and receiving data between a sender and receivers according to an exemplary embodiment of the present disclosure.

FIG. 8 schematically illustrates a process of transmitting and receiving data between a sender and receivers according to an exemplary embodiment of the present disclosure. In FIG. 8, a frame including a transmission data packet is broadcasted to a receiver, and then a frame including a retransmission data packet is broadcasted to the receiver.

A sender may broadcast a data packet to unspecified receivers. The sender may transmit data using the MAC frame shown in FIG. 5. The sender may broadcast the transmitted data using a retransmission frame. In retransmission, the sender may transmit network-coded data as described above.

When the sender uses both a data retransmission scheme using network coding and a packet reception result report request and report scheme, the sender may transmit a packet reception result report request frame to each receiver after retransmission. A format of the packet reception result report request frame is as in FIG. 3. When receiving the packet reception result report request frame from the sender, each receiver sends a packet reception result report frame to the sender. A format of the packet reception result report frame is as in FIG. 4. The sender may transmit the packet reception result report request frame to the receivers so that the packet reception result report frames from the respective receivers do not collide. The use of the retransmission and reception result report request and report scheme can lead to high data transfer stability in a wireless network environment.

The sender may control a transfer rate of the broadcasted data using the information included in the packet reception result report frame. For example, when a data loss rate at each receiver is lower than a predetermined level, the sender may increase the data transfer rate. When the data loss rate becomes higher than the predetermined level due to the increasing transfer rate, the sender may decrease the data transfer rate.

Figure 9:
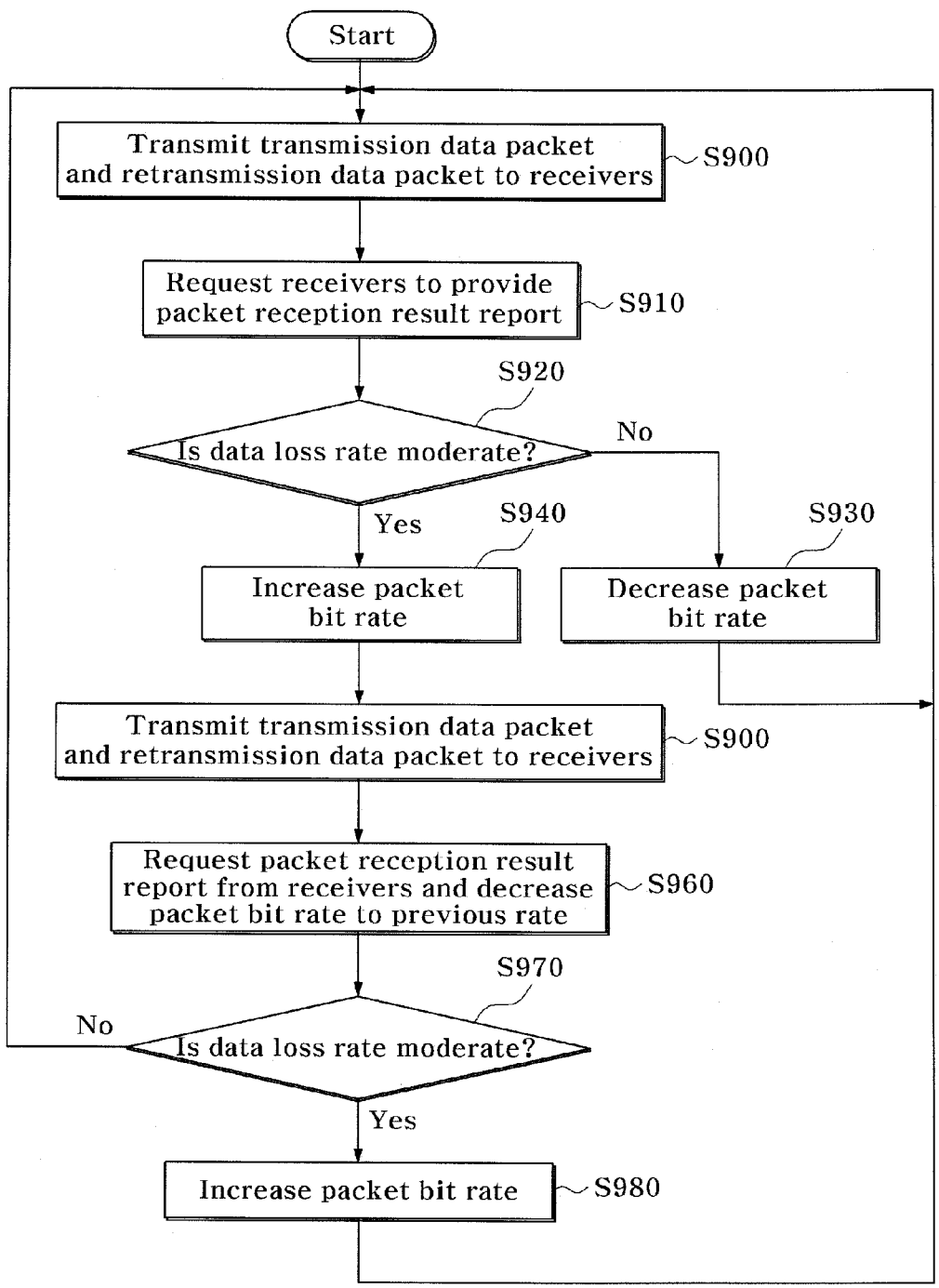
FIG. 9 is a flowchart illustrating an adaptive transfer rate control process according to an exemplary embodiment of the present disclosure.

FIG. 9 is a flowchart illustrating an adaptive transfer rate control process according to an exemplary embodiment of the present disclosure. Here, the data retransmission and packet reception result report request and report described above are both used and the transfer rate is controlled.

A sender transmits a transmission data packet and a retransmission data packet to receivers (S900). The sender may broadcast the transmission data packet and the retransmission data packet to unspecified receivers using the MAC frame. The sender transmits the transmission data packet and the retransmission data packet to the receivers and then requests each receiver to provide a packet reception result report (S910). The packet reception result report request is as described above.

Upon receipt of the packet reception result from the receiver, the sender determines whether a data loss rate is moderate (S920). The loss rate may be obtained from the ratio of an amount of data transmitted by the sender to an amount of data received and processed by the receiver. The sender determines that the loss rate is moderate when it is lower than a predetermined level, and that the loss rate is too bad to maintain a transmitting state when it is higher than the predetermined level. The predetermined level may vary for different embodiments. The sender may compare the highest of loss rates of the respective receivers to the predetermined level, or may compare an average loss rate to the predetermined level. These are only examples and other comparison schemes may be used.

When it is determined in step S920 that the loss rate is not moderate, the sender decreases a packet bit rate (or transfer rate) by one step (S930) and then transmits the transmission data packet and the retransmission data packet to the receiver (S900). When it is determined in step S920 that the loss rate is moderate, the sender increases the packet bit rate by one step (S940) and then transmits the transmission data packet and the retransmission data packet to the receiver (S950). The sender requests the packet reception result report from the receiver and decreases the packet bit rate to a previous rate (S960).

Upon receipt of the packet reception result report from the receiver, the sender determines whether the data loss rate when transmitting with the transfer rate increased by one step is moderate (S970). When it is determined in step S970 that the data loss rate is not moderate, the sender transmits the transmission data packet and the retransmission data packet to the receiver at the previous rate (S900). When it is determined in step S970 that the data loss rate is moderate, the sender increases the packet bit rate by one step (S980) and then transmits the transmission data packet and the retransmission data packet to the receiver (S900).

Although, in FIG. 9, the packet bit rate is decreased to the previous rate in step S960 to prevent a high data loss rate from being maintained during the determination in step S970 as to whether the data loss rate is moderate, the determination as to whether the data loss rate is moderate may be made without decreasing the packet bit rate to the previous rate. In this case, when it is determined that the data loss rate is not moderate, the packet bit rate may decrease to the previous rate. Using the adaptive transfer rate control described above, data can be stably transmitted at a high transfer rate according to an environment in the wireless network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method comprising transmitting network data in a wireless network, wherein the method comprises:
   broadcasting data by a sender;
   requesting by the sender a data reception result report from each receiver; and
   receiving the data reception result report from said each receiver that was requested the data reception result report,
   wherein said data comprises transmission data which is network-coded, and
   wherein said requesting the data reception result report comprises requesting the reception result report using a management MAC frame and receiving a reception result report using a management MAC frame,
   wherein said broadcasting data comprises broadcasting the transmission data with broadcast control information, and the broadcast control information and the transmission data is comprised in a MAC frame,
   wherein the broadcast control information comprises at least one of: sequence order information of all data packets of the transmission data; block identification information; information on sequence within a block; information on a number of times data is transmitted; information on a number of times data is retransmitted; and network coding coefficient information, and
   wherein the broadcasting data comprises broadcasting the transmission data in a MAC frame with at least one of: sequence order information of all data packets of the transmission data; block identification information; information on sequence within a block; information on a number of times data is transmitted; information on a number of times data is retransmitted; and network coding coefficient information.

2. The method of claim 1, wherein the MAC frame comprises:
   request ID information configured to distinguish the MAC frame from other packet reception result report request frames; and
   reception result report request frame identification information.

3. The method of claim 1, wherein the MAC frame comprises at least one of:
   request ID information configured to distinguishing the MAC frame from other packet reception result report request frames;

reception result report request frame identification information;

throughput information; and information on a number of received packets.

4. The method of claim 1, wherein the network-coded transmission data is coded using a network coding matrix.

5. The method of claim 4, wherein the network-coded transmission data is coded by the sender.

6. A method comprising transmitting network data in a wireless network, wherein the method comprises:

broadcasting data by a sender;

requesting by the sender a data reception result report from each receiver;

receiving the reception result report from each receiver that received a request for the reception result report;

determining if a data loss rate at the receiver is moderate based on the reception result report; and controlling a data transfer rate based on said determining, wherein said requesting the data reception result report comprises requesting the reception result report using a management MAC frame and receiving the reception result report using a management MAC frame, and wherein the broadcasting of the data comprises broadcasting transmission data and broadcasting retransmission data; and retransmission data is generated by network-coding the transmission data, wherein said broadcasting data comprises broadcasting the transmission data with broadcast control information, and the broadcast control information and the transmission data is comprised in a MAC frame, wherein the broadcast control information comprises at least one of: sequence order information of all data packets of the transmission data; block identification information; information on sequence within a block; information on a number of times data is transmitted; information on a number of times data is retransmitted; and network coding coefficient information, and wherein the broadcasting data comprises broadcasting the transmission data in a MAC frame with at least one of: sequence order information of all data packets of the transmission data; block identification information; information on sequence within a block; information on a number of times data is transmitted; information on a number of times data is retransmitted; and network coding coefficient information.

7. The method of claim 6, wherein the MAC frame comprises:

request ID information configured to distinguish the MAC frame from other packet reception result report request frames; and reception result report request frame identification information.

8. The method of claim 6, wherein the MAC frame comprises at least one of:

request ID information configured to distinguish the MAC frame from other packet reception result report request frames;

reception result report request frame identification information;

throughput information; and information on a number of received packets.

9. The method of claim 6, wherein said determining if the data loss rate is moderate comprises:

comparing the data loss rate to a predetermined value;

determining that the data loss rate is not moderate if the data loss rate is greater than the predetermined value; and determining that the data loss rate is moderate if the data loss rate is smaller than the predetermined value.

10. The method of claim 6, wherein said controlling the data transfer rate comprises increasing the data transfer rate when the data loss rate is moderate and decreasing the data transfer rate when the data loss rate is not moderate.

11. The method of claim 10, wherein said controlling the data transfer rate comprises:

increasing the data transfer rate and then transmitting data when the data loss rate is moderate;

requesting a reception result report from the receiver and decreasing the data transfer rate to a previous rate;

determining if the data loss rate at the receiver is moderate when the data transfer rate is increased based the reception result report; and increasing the data transfer rate when the loss rate is moderate.

12. The method of claim 10, wherein said controlling the data transfer rate comprises:

increasing the data transfer rate and then transmitting data when the data loss rate is moderate;

requesting a reception result report from the receiver;

determining if the data loss rate at the receiver is moderate when the data transfer rate is increased based the reception result report; and decreasing the data transfer rate to a previous rate when the loss rate is not moderate.

13. The method of claim 6, wherein the retransmission data is generated by network-coding the transmission data using a network coding matrix.

14. The method of claim 13, wherein the sender codes the transmission data to generate the retransmission data.

* * * * *